United States Patent [19]

Walsh et al.

[11] Patent Number: 5,903,261

[45] Date of Patent: *May 11, 1999

[54] COMPUTER BASED VIDEO SYSTEM

[75] Inventors: Bruce E. Walsh, Londonderry, N.H.; John Herdrich, Holden, Mass.; William Smith, Fitchburg, Mass.; Mark E. Vrabel, Southbridge, Mass.; Philip Borghesani, Acton, Mass.; Christine G. Hagberg, Hopkinton, Mass.; Karen Champagne, Millburry, Mass.

[73] Assignee: Data Translation, Inc., Marlboro, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/666,960

[22] Filed: Jun. 20, 1996

[51] Int. Cl.$^6$ .................................................. G09G 5/00
[52] U.S. Cl. ............................................ 345/302; 345/418
[58] Field of Search ....................................... 395/806, 807; 382/235, 236; 345/302, 418; 348/423, 845.3; 352/12

[56] References Cited

U.S. PATENT DOCUMENTS

| | | | |
|---|---|---|---|
| 4,521,879 | 6/1985 | Gueldenpfennig et al. | 370/62 |
| 5,040,061 | 8/1991 | Yonemitsu | 358/135 |
| 5,146,325 | 9/1992 | Ng | 358/135 |
| 5,191,436 | 3/1993 | Yonemitsu | 358/335 |
| 5,212,742 | 5/1993 | Normile et al. | 382/56 |
| 5,260,783 | 11/1993 | Dixit | 358/136 |
| 5,267,334 | 11/1993 | Normille et al. | 382/56 |
| 5,287,178 | 2/1994 | Acampora et al. | 348/384 |
| 5,293,229 | 3/1994 | Iu | 348/415 |
| 5,301,242 | 4/1994 | Gonzales et al. | 382/56 |
| 5,319,793 | 6/1994 | Hancock et al. | 395/807 |
| 5,327,248 | 7/1994 | Miller et al. | 358/261.4 |
| 5,329,365 | 7/1994 | Uz | 348/469 |
| 5,335,321 | 8/1994 | Harney et al. | 395/162 |
| 5,353,062 | 10/1994 | Maeda | 348/412 |
| 5,387,940 | 2/1995 | Kowek et al. | 348/446 |
| 5,400,075 | 3/1995 | Savatier | 348/384 |
| 5,404,437 | 4/1995 | Nguyen | 395/152 |
| 5,426,464 | 6/1995 | Casavant et al. | 348/415 |
| 5,428,751 | 6/1995 | Dollinger et al. | 395/325 |

(List continued on next page.)

OTHER PUBLICATIONS

International Search Report.

Primary Examiner—Richard Hjerpe
Assistant Examiner—Ricardo Osorio
Attorney, Agent, or Firm—Fish & Richardson P.C.

[57] ABSTRACT

A computer based system for displaying and compressing video including a video capture card with a video compressor and a bus interface circuit that acts as a busmaster and outputs uncompressed video and compressed video to a computer bus for display of the uncompressed video on the computer monitor and storage of the compressed video on a memory of the computer. The system also includes a software virtual interrupt generator that uses timer events provided by a computer system service and a transfer status indicator to generate interrupts to initiate transfer of a new block of video; an overlay controller implemented in software that transfers video from the video capture card over the computer bus to a graphics subsystem for display in a window on the computer monitor in an overlay mode; a display controller implemented in software that causes display of uncompressed video from the video capture card or software decompressed video; a software controller that compresses audio in software and sends video data to be compressed across the computer bus to the compressor; a controller that is implemented in software and calibrates startup delay of the audio input subsystem and uses the delay to synchronize the audio and video; and a user interactive input mechanism for adjusting the rates of compression within a range of acceptable rates that varies as a function of the output target medium for compressed video.

8 Claims, 12 Drawing Sheets

U.S. PATENT DOCUMENTS

| | | | |
|---|---|---|---|
| 5,430,847 | 7/1995 | Bradley et al. | 395/325 |
| 5,438,663 | 8/1995 | Matsumoto et al. | 395/162 |
| 5,442,747 | 8/1995 | Chan et al. | 395/164 |
| 5,444,575 | 8/1995 | Augenbraun et al. | 360/64 |
| 5,446,869 | 8/1995 | Padgett et al. | 395/500 |
| 5,448,310 | 9/1995 | Kopet et al. | 348/699 |
| 5,455,915 | 10/1995 | Coke | 395/325 |
| 5,461,679 | 10/1995 | Normile et al. | 382/304 |
| 5,471,577 | 11/1995 | Lightbody et al. | 395/157 |
| 5,481,543 | 1/1996 | Veltman | 370/94.1 |
| 5,488,695 | 1/1996 | Cutter | 395/290 |
| 5,506,932 | 4/1996 | Holmes et al. | 395/2.14 |
| 5,508,940 | 4/1996 | Rossmere et al. | 395/806 |
| 5,550,578 | 8/1996 | Hoarty et al. | 348/7 |
| 5,583,652 | 12/1996 | Ware | 395/806 |

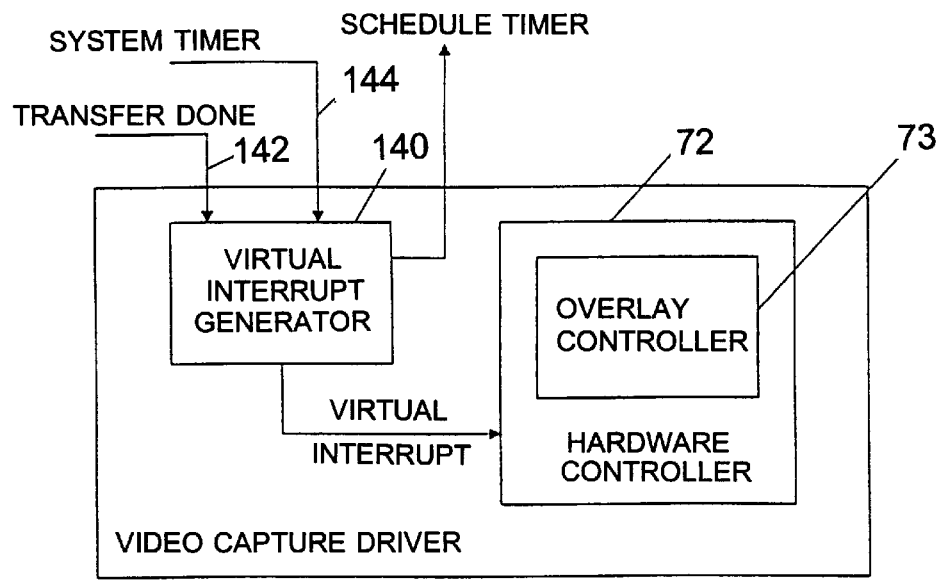
FIG. 3B
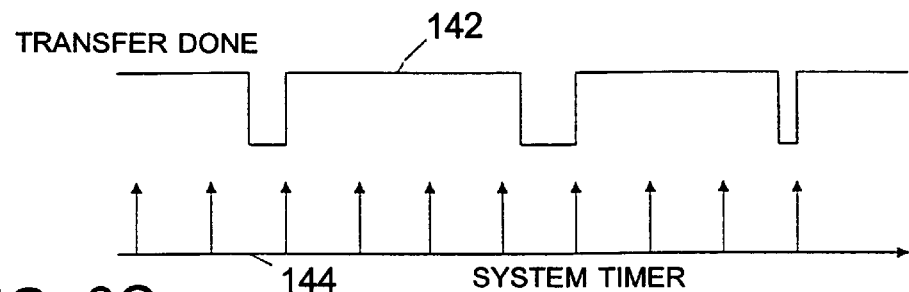
FIG. 3C
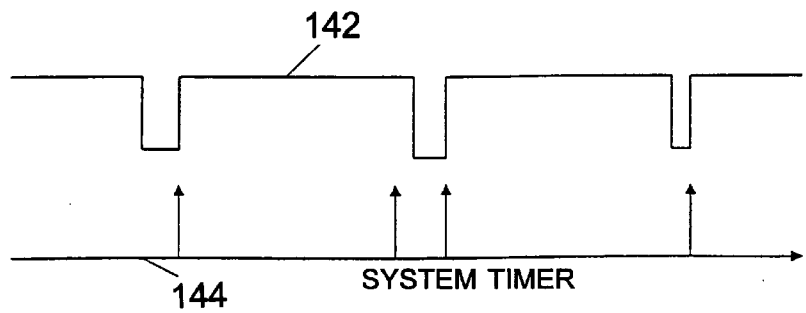
FIG. 3D

COMPUTER BASED VIDEO SYSTEM

BACKGROUND OF THE INVENTION

The invention relates to a computer based video system.

Computers have been used to edit and create video programs using digitized video. Owing to the large amount of data involved in even a single frame of video, it is typical to compress the digitized data. One compression format that is used is JPEG, which involves compressing the data on a frame-by-frame basis, permitting edits to be easily made at frame boundaries on the compressed data. Another compression format that has been used is MPEG, which can be used to partially compress the video into so-called I-frames, which rely only on the information in a single frame, or to fully compress the video into IBP frames, which rely on the information in subsequent and prior frames. Full MPEG encoding achieves a higher level of compression, though edits cannot be easily made on the fully-compressed videos.

Some computer based video systems have relied on software compressors to compress video data while others have used compressors/decompressors implemented in integrated circuit chips.

In computer based video systems, a hardware frame buffer is often connected by a direct hardwire connection to a graphics subsystem for display of the frame buffer contents in a window on a computer monitor in an overlay mode.

SUMMARY OF THE INVENTION

In one aspect the invention features in general circuitry for displaying and compressing video that includes an input port, a bus transmission buffer, and a bus interface circuit. The input port receives uncompressed video in real time, and the compressor receives the uncompressed video from the input port and outputs compressed video. The bus transmission buffer is connected to receive either the uncompressed video from the input port or the compressed video from the compressor. The bus interface circuit controls the inputs to the bus transmission buffer and acts as bus master of a bus of the computer. The bus interface circuit also receives the uncompressed video and the compressed video from the bus transmission buffer and outputs the uncompressed video and the compressed video to the bus for display of the uncompressed video on the monitor of the computer and storage of the compressed video on a memory of the computer.

Certain implementations of this aspect of the invention include one or more of the following features. In certain implementations, the uncompressed video includes frames of even and odd fields, and the bus transmission buffer receives one of the fields of each frame for output to the bus and receives the compressed video during the other field of each frame for output to the bus. The bus transmission buffer is a FIFO, and a multiplexer controls the input of uncompressed video or compressed video in response to control signals from the bus interface circuit. The multiplexer is controlled to latch a portion of the pixels in a line of a field of uncompressed video to decimate the uncompressed video in a horizontal direction. A decoder receives analog video from the input port and converts it to digitized video, e.g., in YUV format. The compressor is a video RISC processor, and the compressed video is in the form of MPEG I-frames. The bus interface circuit controls a first bus master channel for the uncompressed video and a second bus master channel for the compressed video and includes first and second address counters for specifying respective addresses in the memory for the first and second channels; the bus interface circuit also includes a master control state machine that controls the bus transmission buffer to provide the uncompressed video with an address from the first buffer and the compressed video with an address from the second buffer. The bus interface circuit also includes a FIFO input control that controls the multiplexer to alternatively output the uncompressed video from the input port and the compressed video from the compressor during alternate fields of uncompressed video The circuitry resides on a peripheral board for use in an expansion slot of a personal computer.

Embodiments of this aspect of the invention may include one or more of the following advantages Because the data are not stored on the video capture board, the memory requirements for the board are reduced. The host computer's monitor is used to view the source material avoiding the need for an external monitor. The display on the monitor is maintained in synchronization with the video being captured.

In another aspect the invention features in general a computer system for handling video that transfers blocks of video to or from a picture buffer without relying on computer interrupts. A bus interface circuit of the computer system is operable to transfer video in blocks to or from a picture buffer under the control of a software controller. A software virtual interrupt generator uses timer events provided by a computer system service and accesses a transfer status indicator indicating whether a transfer has been completed to generate interrupts that cause the software controller to initiate a transfer of a new block of video.

Certain implementations of this aspect of the invention include one or more of the following features. In certain implementations the computer system service that provides the timer events is a multimedia timer provided by an operating system (e.g., Windows 95) of the computer. The picture buffer resides on a system memory on a bus of the computer; alternatively the picture buffer can reside on a peripheral board in an expansion slot of a personal computer. The video being transferred is compressed or uncompressed video, and the blocks are frames or fields of interlaced video. The bus interface circuit acts as a busmaster; alternatively the bus interface circuit acts as a slave. The software controller and the software virtual interrupt generator are part of a video capture driver. In some implementations the timer events are scheduled to occur at regular intervals; in some other implementations the software virtual interrupt generator requests that the timer events occur at intervals matched to the rate at which transfers are completed, and requests a supplemental timer event a short time after a timer event if the transfer status indicator indicates that the transfer has not yet been completed.

Embodiments of this aspect of the invention may include the following advantage. Because blocks of video data thus are transferred without relying on CPU interrupts, which are limited computer resources in high demand by other components of the computer system, installation of the video system on the computer is greatly simplified.

In another aspect the invention features in general a computer system for displaying video on a computer monitor in an overlay mode. The system includes a video capture card with an input port receiving video in real time, a graphics subsystem connected to the monitor, and a graphics software driver that supports a standard bus interface to the graphics subsystem. The system also includes an overlay controller that is implemented in software and transfers the video from the video capture card over the bus to the graphics subsystem for display in a window on the monitor in an overlay mode.

Certain implementations of this aspect of the invention include one or more of the following features. In certain implementations there is a virtual overlay buffer provided in the computer's system memory, and the overlay controller transfers video over the bus to the virtual overlay buffer and then transfers video from the overlay buffer to the graphics subsystem. Alternately the overlay buffer can reside on the graphics subsystem. The overlay controller includes an overlay application program and a video capture driver that supports a standard overlay interface to the application program.

Embodiments of this aspect of the invention may include one or more of the following advantages. The graphics card can be used for prompt (virtually instantaneous) display of an overlay on the computer monitor without the need for a hardwired connection or the concern for compatibility of overlay hardware and graphics subsystem hardware. In addition, the software overlay controller is compatible with any standard graphics subsystem and can employ any standard overlay application.

In another aspect the invention features in general a computer system for displaying and compressing video on a computer in either a "preview model" or an "overlay mode." The computer system includes an input port that receives uncompressed video in real time, a compressor that converts the uncompressed video from the input port to compressed video, and a bus interface circuit that is operable to transfer the uncompressed video and the compressed video to a computer bus. A display controller that is implemented in software is programmed to selectively display an image of the video being compressed either in a preview mode in which the compressed video transferred to the bus is decompressed and displayed on a computer monitor or in an overlay mode in which uncompressed video transferred to the bus is displayed on the monitor of the computer.

Certain implementations of this aspect of the invention include one or more of the following features. In certain implementations the user can select the preview mode or the overlay mode in both a "viewing without capture" mode and a "viewing" with capture mode. The user can also select a no-display mode during a capture mode. A dialog box displayed on the monitor and a selection control device are used to make the user selections. The display controller includes a video capture driver that controls the compressor and bus interface circuit. The display controller includes an application program and a software decompressor. The compressor is a video RISC processor, and the compressed video is in the form of MPEG I-frames.

Embodiments of this aspect of the invention may include one or more of the following advantages. The overlay mode, which generally has better performance than the preview mode, can be employed on those platforms that have fast data transfer over the bus, while the preview mode can be used on systems that do not have sufficiently fast bus operation to support such transfer. Thus, the overlay system can be used on a variety of platforms having different levels of performance, and the best performance provided by the computer can be employed. In addition, in the preview mode the user can assess the quality of the captured and decompressed video The system permits on the fly switching between modes.

In another aspect the invention features in general a computer system for decompressing and displaying video on a computer monitor in either a hardware decompression mode or a software decompression mode. The system includes a decompressor circuit, a bus interface circuit, and a display controller. The decompressor circuit converts compressed video to decompressed video. The bus interface circuit can operate in a playback mode in which compressed video is received from the computer bus and provided to the decompressor circuit, and decompressed video from the decompressor circuit is transferred to the computer bus. The display controller is implemented in software and is programmed to selectively display an image of the video being decompressed in either a software mode in which the compressed video is decompressed in software and displayed on a computer monitor or in an hardware mode in which compressed video that has been decompressed at the decompressor circuit and transferred to the bus is displayed on the monitor.

Certain implementations of this aspect of the invention include one or more of the following features. In certain implementations the display controller automatically determines whether video transfers over the bus are sufficiently fast to support display of video that has been decompressed at the decompressor circuit, and automatically selects either the hardware mode or the software mode as a result of the determination. The preview mode can also be used to decompress and display video when the hardware is busy with other tasks. The decompressor circuit resides on a peripheral board that plugs into an expansion slot of the computer. The decompressor is a video RISC processor, and the compressed video is in the form of MPEG I-frames.

In another aspect the invention features in general a computer system for compressing and storing video and audio on a computer. The system includes a compressor circuit that receives video and outputs compressed video, and a software controller that compresses audio in software and sends video data to be compressed across the bus to the compressor circuit.

Certain implementations of this aspect of the invention include one or more of the following features. In certain implementations the video received by the compressor circuit is in the form of MPEG I-frames, and the compressed video is in the form of full MPEG IBP frames. Alternatively, the video received by the compressor circuit is in the form of uncompressed video. The software controller operates in threads and compresses audio in one thread and sends video data to be compressed across the bus to the compressor circuit in another thread.

Embodiments of this aspect of the invention may include the following advantages. The use of hardware video compressor software audio compression permits parallel compression by two processors, which reduces the compression time without the need for additional circuitry.

In another aspect the invention features in general a computer system for compressing and storing video and audio on a computer. The system includes an audio input subsystem that receives and digitizes audio, a video input port that receives uncompressed video in real time, a compressor circuit that compresses the uncompressed video from the input port, and a controller that is implemented in software and calibrates the startup delay of the audio input subsystem and uses the delay to synchronize the audio and video.

Certain implementations of this aspect of the invention include one or more of the following features. In certain implementations the controller calibrates startup delay of the audio input subsystem by sending an instruction to start digitizing audio and monitoring how long it takes the audio input subsystem to start digitizing after the instruction has been sent. The delay is determined by monitoring of a buffer in the audio driver. The audio input subsystem includes a sound card that plugs into an expansion slot of the computer system; alternatively the audio circuitry can reside on the motherboard. The video input port and the compressor circuit reside on a peripheral board that plugs into an expansion slot of the computer systems.

Embodiments of this aspect of the invention may include one or more of the following advantages. The synchronization technique permits one to use a video card with any audio input subsystem without a direct connection. Also, one does not need to have an audio input subsystem on the video capture card, but can use the computer's standard audio subsystem while still maintaining good audio/video synchronization.

In another aspect the invention features in general a computer system for compressing video. The system includes a video compressor for compressing uncompressed input video at adjustable rates of compression, and a user interactive input mechanism for adjusting the rates of compression within a range of acceptable rates, the range of acceptable rates varying depending upon the output target medium for compressed video.

Certain implementations of this aspect of the invention include one or more of the following features. In certain implementations the user interactive input mechanism includes a mechanism for the user to select an output target medium and the ranges are based upon the selected target medium. Range adjusting sliders are displayed on a computer monitor to select a desired compression. Audio compression rates are similarly selected within varying ranges.

Other advantages and features of the invention will be apparent from the following description of the preferred embodiment and from the claims. E.g., various combinations of the features described above can be combined in a computer video system to provide further improvements and advantages.

BRIEF DESCRIPTION OF THE DRAWINGS

FIG. 3B is a diagram of modules used to provide a no-interrupt video transfer in the FIG. 1 computer based video system.

FIGS. 3C and 3D are timing diagrams for two different implementations of no-interrupt video transfer.

DESCRIPTION OF THE PREFERRED EMBODIMENTS

After describing the major system components, the various modes of operation of the computer based video system will be reviewed, and then some of the operations will be discussed in detail.

Major System Components

Figure 1:
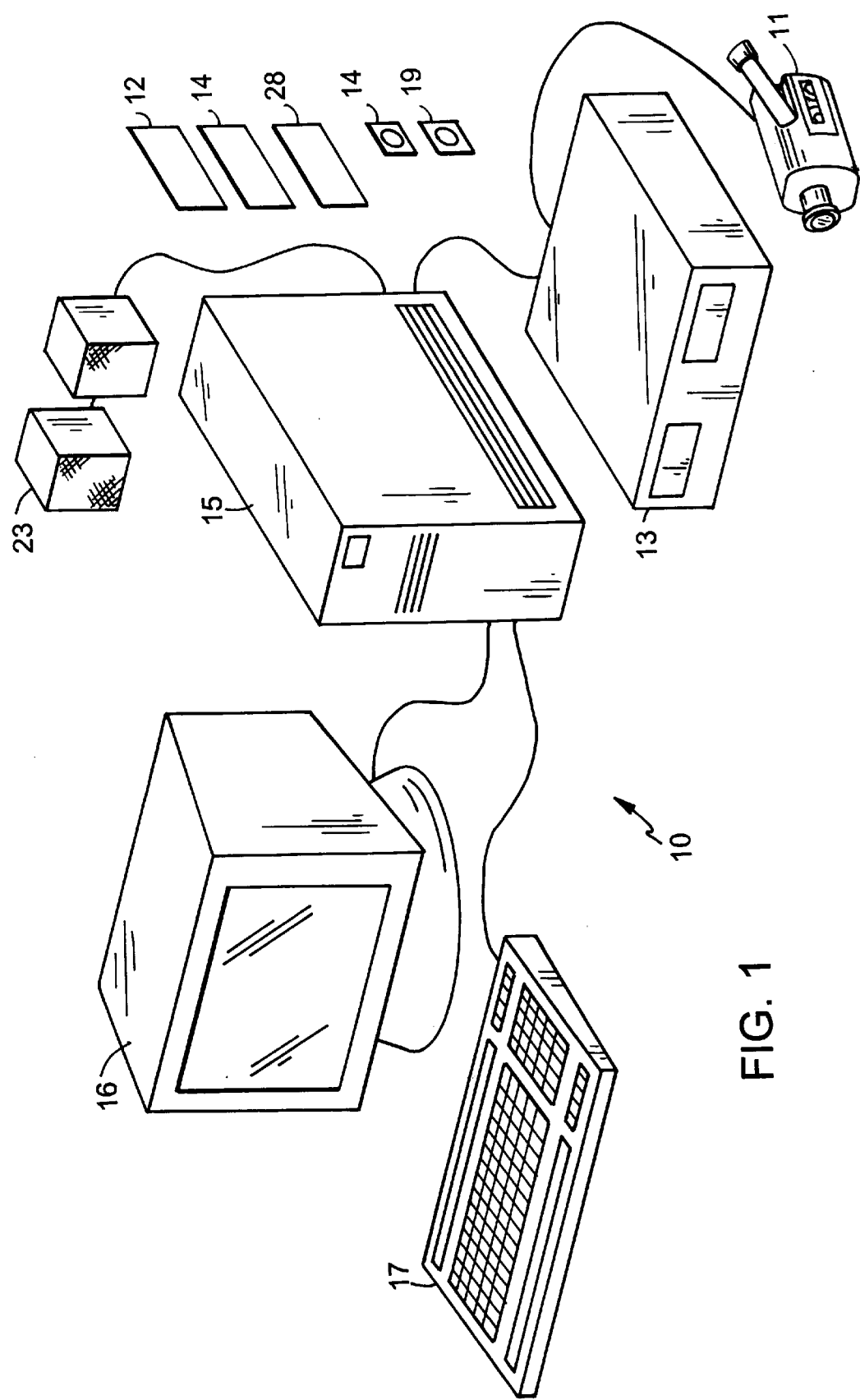
FIG. 1 is a diagram showing some of the components of a computer based video system according to the invention.

Referring to FIG. 1, there is shown personal computer based video system 10 for capturing and digitizing video data from camera 11, VCR 13 or other source and then editing the digitized video to create short video programs, useful, e.g., in business presentations or transfer over a network. System 10 is based upon personal computer 15, which has an associated monitor 16, keyboard 17, and speakers 23 and is provided with digital video card 12 and associated video control software 19 (both described in detail below) and commercially available graphics card 14 (e.g., available from Diamond Multimedia under the Stealth 64 trade designation) and sound card 28 (e.g., available from Creative Labs under the Sound Blaster trade designation) Computer 15 is Pentium based with 16 Mbytes RAM, 1 G bytes disk, and a 133 MHz clock, Windows 95 with Video for Windows operating system, and appropriate multimedia sound drivers and graphic drivers for sound and graphics cards.

Figure 2:
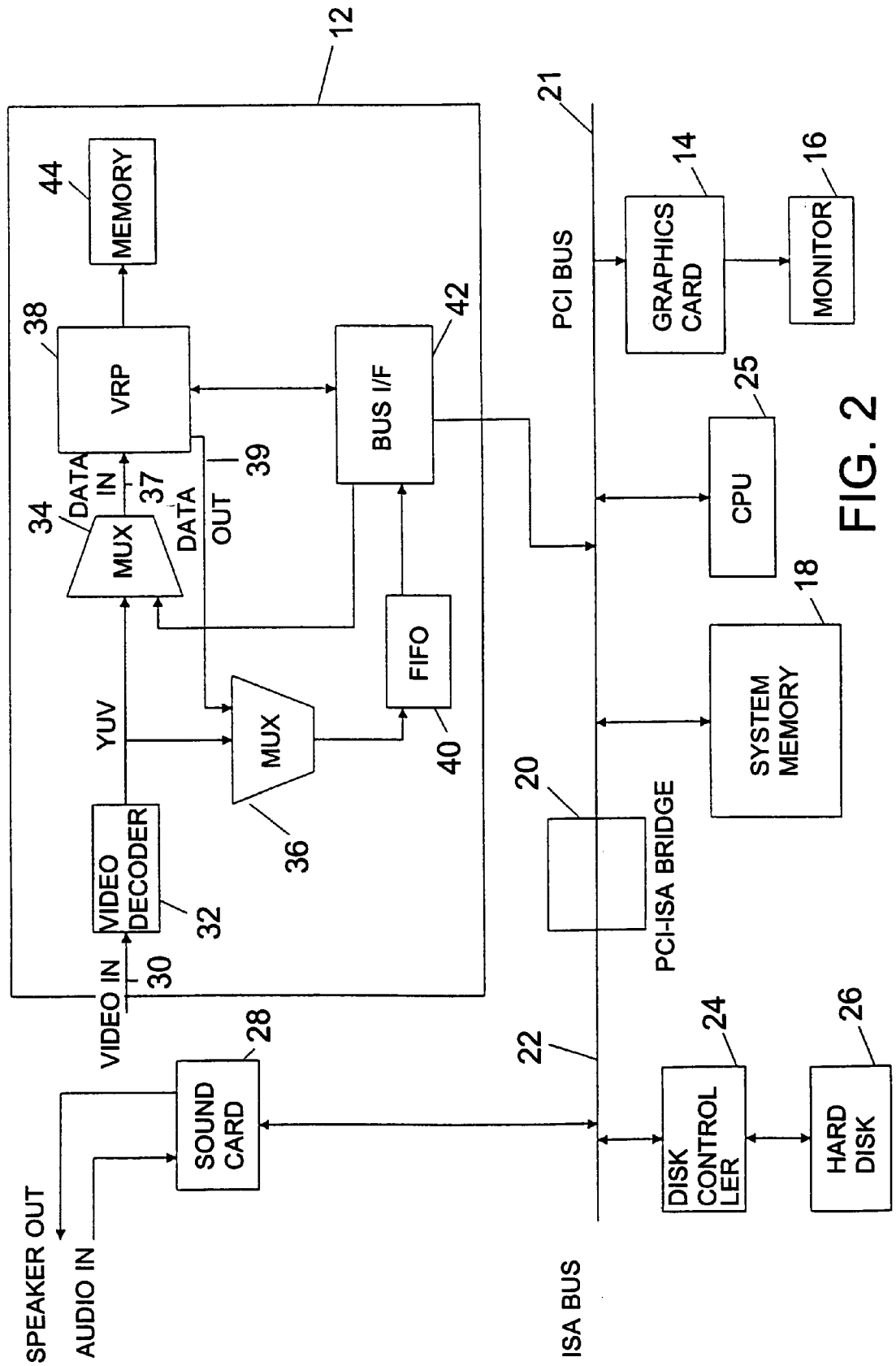
FIG. 2 is block diagram of the FIG. 1 computer based video system.

Referring to FIG. 2, digital video card 12, graphics card 14, CPU 25, and system memory 18 are shown connected to PCI system bus 21 of computer 15. PCI bus 21 is connected via PCI-ISA bridge 20 (e.g., an integrated circuit of a chip set available from Intel under the 82430FX trade designation) to ISA bus 22. The combination of bus 21 and bus 22 are sometimes referred to as a computer bus herein. Disk controller 24 is connected to ISA bus 22 and controls hard disk 26. Sound card 28 also is connected to ISA bus 22 and has audio-in and speaker connections. Graphics card 14 controls monitor 16 and performs YUV to RGB conversion and has standard overlay capability.

Digital video card 12 has a video input port 30 connected to video decoder 32 (Philips SAA7111). Video decoder 32 converts input analog video (in PAL or NTSC) and outputs its digital video in YUV (422) format to multiplexer 34 and multiplexer 36. The output of multiplexer 34 is connected as data-in input 37 to video RISC processor 38 (a compressor/decompressor circuit available under the 4110 trade designation from C-cube) Data-out output 39 of video RISC processor 38 is provided as a second input to multiplexer 36, which has an output to FIFO 40, which in turn is connected to bus interface circuit 42. Video RISC processor 38 also is connected to memory 44 (2 megabytes dynamic ram). Video RISC processor 38 also receives control signals over host interface control lines (not shown) via bus interface circuit 42.

Figure 3:
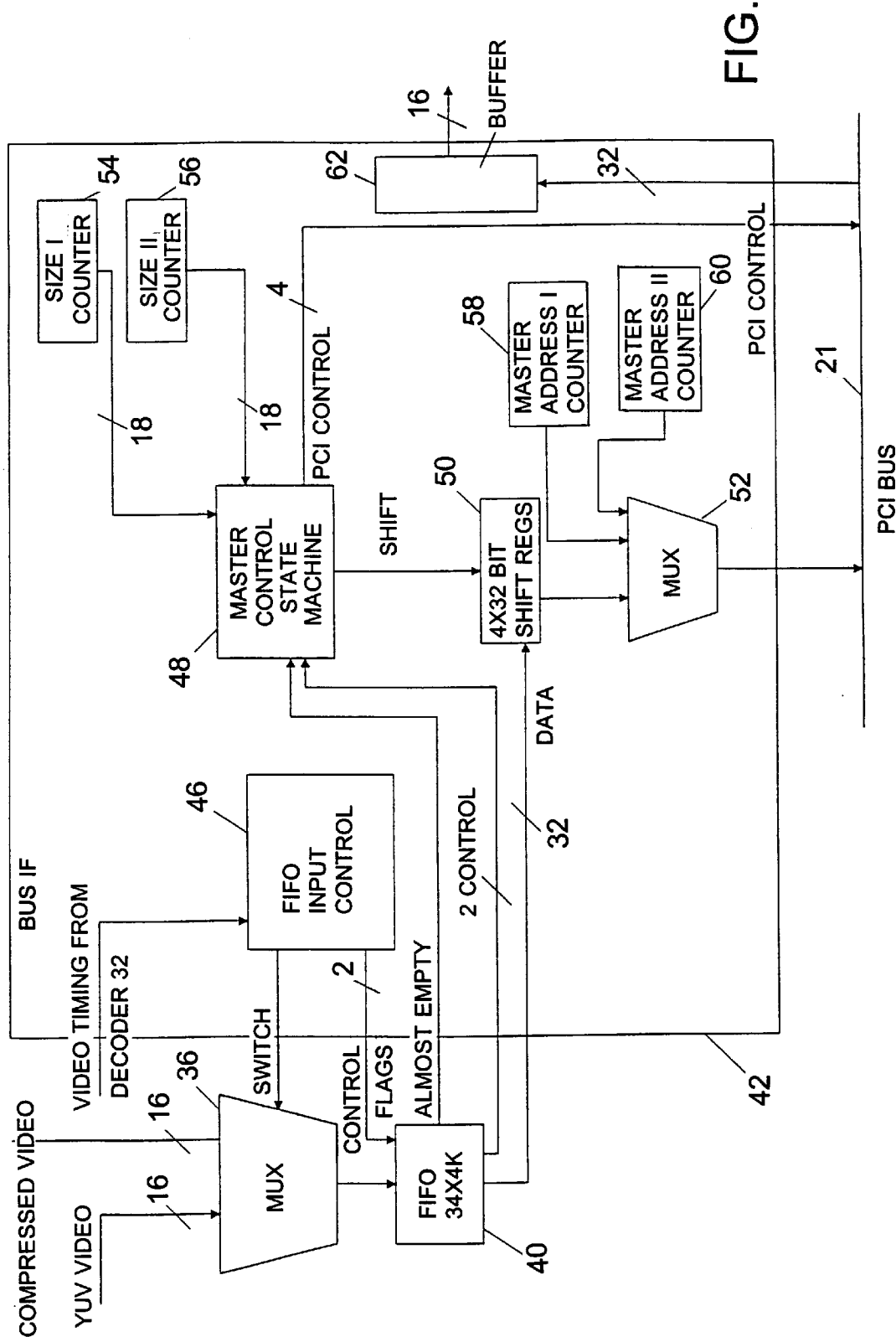
FIG. 3 is block diagram showing some of the components of the FIG. 1 computer based video system in more detail.

Referring to FIG. 3, bus interface control circuit 42 is shown in more detail. It includes FIFO input control circuit 46, master control state machine 48, 4×32 shift registers 50, multiplexer 52, size-I counter 54, size-II counter 56, master address-I counter 58, master address-II counter 60, and busmaster-I data input buffer 62. Circuit 42 is manufactured as an integrated circuit (e.g., a gate array) having the components and functionality described herein.

Figure 3A:
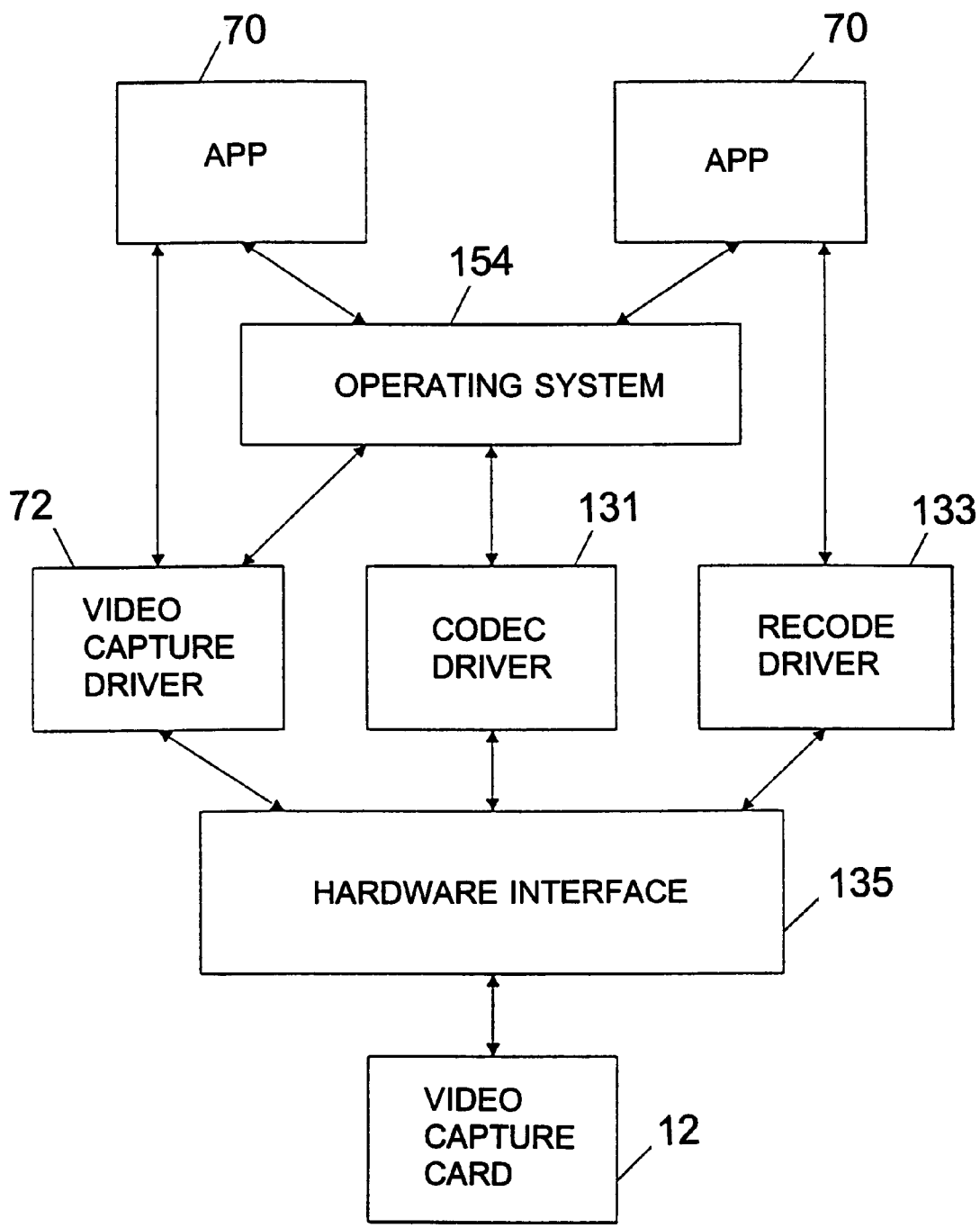
FIG. 3A is a diagram showing layers of software control used to control a video capture card of the FIG. 1 system.

Referring to FIG. 3A, the layers of software control are shown. Application programs 70 either operate through operating system 154 (Windows 95, including Video for Windows) on video capture driver 72 and codec driver 131 or operate directly on video capture driver 72 and recode driver 133. Video capture driver 72, codec driver 131, and recode driver 133 can control video capture card 12 through hardware interface 135, which permits control by one driver at a time.

Modes of Operation

Computer based video system 10 is capable of operating in a variety of different capture modes and playback modes depending upon user selections and data transfer capabilities of computer 15. The various modes of operation will first be generally discussed in turn before discussing details of the operations employed in the modes.

1. Pass Through Mode

In the pass through mode, video data are collected from the hardware and displayed to the user on system monitor 16. The user typically uses this mode to initially view the source material before making any decisions as to what material may be included in the video clip being prepared. Referring to FIG. 2, analog video (PAL or NTSC) comes in through video input port 30 and is converted to a digital signal using video decoder 32. Digital video data then pass through multiplexer 36 and FIFO 40 to bus interface circuit 42. The data are then transferred across PCI bus 21 to system memory 18. Video capture driver 72 (FIG. 5) then moves the image data in system memory 18 to graphics card 14 for display on analog monitor 16.

2. I-frame Capture Mode

In the I-frame capture mode, the input video data are compressed, sent across bus 21 to system memory 18 and typically saved on hard disk 26 for later use in creating a program In some cases compressed video might be sent across a LAN (not shown) for transmission to a remote device. The analog video signal comes through input port 30 and is decoded into digital format with video decoder 32, and the digital video data are sent through multiplexer 34 to video RISC processor 38. Video RISC processor 38 converts the data into a compressed (MPEG, I-frame only) format and sends the data via its data output port 39 through multiplexer 36 and FIFO 40 to bus interface circuit 42. Bus interface circuit 42 transfers the data to system memory 18. The data are sent via video capture driver 72 (FIG. 5) across PCI-ISA bridge 20 to disk controller 24 for storage on hard disk 26.

3. Toggle mode

Another data capture mode is the "toggle" mode. It combines the features of the previous two modes, pass through and I-frame capture. The input analog video signal passes through input port 30 to video decoder 32, and the digitized YUV video data pass through both multiplexers 34 and 36. From multiplexer 34, the YUV digital video data are sent to video RISC processor 38 for I-frame compression, and the compressed I-frame data that are output to one input of multiplexer 36. Multiplexer 36 thus has both compressed I-frame data and uncompressed YUV data which it alternately sends to FIFO 40. Bus interface circuit 42 takes the output of the FIFO 40 and sends the YUV data and I-frame data to different sections in system memory 18. Video capture driver 72 (FIG. 5) then moves the uncompressed YUV data across PCI bus 21 to graphics card 14 for display on monitor 16. At the same time video capture driver 72 moves the compressed I-frame data from system memory 18 to hard disk controller 24 for storage on the hard disk 26.

4. IBP Capture Mode

The IBP capture mode is similar to the I-frame capture mode except that instead of compressing the data to an I-frame format, the data are compressed into a full IBP compressed MPEG format.

The four modes that have just been described are all capture modes and all operate in real time. The remaining three modes involve decompression for playback or for full compression of the data.

5. The Codec Mode

In the codec mode, video RISC processor 38 either compresses a single frame of uncompressed data or decompresses a single frame of compressed data.

6. IBP Compression Mode

In the IBP compression mode, a series of I-frame compressed frames or uncompressed frames (eg., stored on disk 26) are converted to an MPEG 1 IBP fully compressed video stream with or without display on monitor 16.

7. IBP Playback Mode

In the IBP playback mode, a fully compressed IBP MPEG stream is decompressed to a form a series of uncompressed frames with or without display on monitor 16.

The data paths for the codec, IBP compression and IBP playback modes are the same. The data originate in system memory 18 (e.g., after transfer there from disk 26) and are transferred across PCI bus 21 into buffer 62 of bus interface circuit 42 (FIG. 3). The data in buffer 62 then pass through multiplexer 34 into video RISC processor 38.

The data processed by video RISC processor 38 pass through multiplexer 36 and FIFO 40 back to bus interface circuit 42, and from there to another area of system memory 18. This data transfer across bus interface circuit 42 moves data to and from card 12 simultaneously, as is discussed in more detail below.

Simultaneous Data Bus Transfer Operations

Referring to FIGS. 2 and 3, we will now describe the detailed operation of bus interface circuit 42 in simultaneously transferring different combinations of uncompressed, compressed and decompressed data to and from PCI bus 21. We will first describe the simultaneous transfer of both uncompressed and compressed video from card 12 to PCI bus 21, e.g., to permit display of uncompressed video at the same time that the data are being compressed as I-frames and stored on disk.

The analog video input at port 30 is interlaced such that an even field and an odd field make up each frame of video. The even and odd fields are transmitted sequentially, and digital video card 12 makes use of this multiplexing in order to provide real time capture and display in which the uncompressed YUV data are transferred during an even field of video and the compressed, I-frame data are transferred during the odd field of video. The transfer of only the even field acts to decimate the uncompressed YUV data in a horizontal direction; in addition, the YUV data are decimated at multiplexer 36 in a vertical direction by taking only half of the pixels in a line prior to transfer to PCI bus 21. The uncompressed data are considered to be transferred through one channel of multiplexer 36, FIFO 40 and bus interface circuit 42, and the compressed data are considered to be transferred through another channel of these components.

FIFO input control circuit 46 receives video timing information that originates in video decoder 32 (FIG. 2) and indicates which field of data is currently being transferred from decoder 32. If the data are in the even field, then FIFO input control circuit 46 switches multiplexer 36 to take the uncompressed YUV data into FIFO 40 with the "switch" control to multiplexer 36 and indicates that YUV data are being transferred via the two control flags which are input to FIFO 40 along with the data. At the end of the even field, FIFO input control circuit 46 switches multiplexer 36 to transfer the compressed data that originate in video RISC processor 38 (FIG. 2). Again, FIFO input control circuit 46 marks the origin of the data using the two bits of control flags that are stored in FIFO 40.

The next phase of the transfer of video data is controlled by master control state machine 48, which directs the transfer of the uncompressed and the compressed video data to two different sections of system memory 18. Each section of memory 18 has an associated busmaster transfer address counter 58 or 60 (indicating address in memory 18 for sending data) and an associated size counter 54 or 56 (indicating the size of the block of data to be sent). Master control state machine 48 uses an "almost empty flag" and two control lines from FIFO 40 to indicate the existence of valid data to be transferred and the destination in memory 18 as either uncompressed or compressed. Master control state machine 48 also monitors the control information for PCI bus 21 and determines when a PCI busmaster cycle is allocated. At that time, master control state machine 48 generates the timing signals necessary to first put the appropriate address for the channel from either master address-I counter 58 or master address-II counter 60 through multiplexer 52 onto the PCI bus, and then moves the data from FIFO 40 into 4×32 shift registers 50. Master control state machine 48 then causes shift register 50 to shift and move its data through multiplexer 52 to PCI bus 21.

Master control state machine 48 makes use of the total transfer size counter-I 56 and size counter-II 56 to count how much data is to be sent to the appropriate busmaster channel. The actual operation of the master control state machine 48 is controlled via the two control lines from FIFO 40 that mark the type of data. Master control state machine 48 sends the data to the appropriate busmaster channel I or II, depending on the state of these control lines, using either address I and size I or address II and size II depending on the two control signals of FIFO 40.

Master control state machine 48 performs a PCI busmaster cycle by using the busmaster mode of a single address and many data writes. Master control state machine 48 initiates a transfer of either 64 words at once or 4 words at once depending on the "almost empty" flag of the FIFO 40. Master control state machine 48 also monitors the PCI bus control information to see if it needs to stop transferring at any point in the process In addition, the control signals and "almost empty" flag from FIFO 40 are monitored to determine if the transfer should be stopped because there are no more data left for the current transfer. At the end of the transfer of a block of data, which is up to 64 words, the appropriate size counter 54 or 56 and the appropriate master address counter 58 or 60 are updated.

When all the transfers have been completed, such that the one of the size counters 54, 56 counts to zero, master control state machine 48 does not send any more data and instead generates a "transfer done" for that channels At this time, the driver software uses the transfer done status to set up for the next transfer by reprogramming the size and address registers.

Referring to FIGS. 3B and 3C, in one implementation, virtual interrupt generator 140 periodically monitors the "transfer done flag" 142 in response to system timer pulses 144 provided by the operating system at regular intervals in order to determine when a transfer to a buffer (referred to as a "picture buffer" herein) in memory 18 has been completed. System timer pulses 144 are a computer system service provided by the Windows 95 (including Video for Windows) operating system If the transfer done flag 142 is low, a virtual interrupt is provided to capture driver 72, which then sets up for the next transfer, which causes the "transfer done" flag to go high and the size and address counters to be reprogrammed. As shown in FIG. 3C, there is a variable latency associated with the use of the timer pulses. By decreasing the period between timer pulses, the maximum delay can be reduced at the expense of increased system overhead to provide the pulses.

FIG. 3D shows the timing for a different implementation in which system timing pulses 144 are scheduled by virtual interrupt generator 140 to occur when a transfer done flag is expected (i.e., at about $\frac{1}{30}$th of a second for NTSC). If the transfer done flag is not low, then the next timing pulse is scheduled to occur in a much shorter time, and adjustments are made in predicting when the next transfer flag is expected. In this implementations the delay between the transfer done flag and the virtual interrupt is kept low at the same time that the system overhead associated with the timing pulses is kept low. Virtual interrupt generator 140 schedules the timing pulses 144 by appropriate requests to the operating system service.

In other modes of operation, data can be simultaneously transferred to video card 12 from system memory 18 at the same time that transformed video data (e.g., processed at video RISC processor 38) are transferred from card 12 to memory 18. These transfers are also controlled by master control state machine 48. Busmaster control channel I is used for input from system memory 18, and channel II is used for the output. The processing is similar to that already described for a simultaneous transfer from card 12 to memory 18, except that the input over channel I involves a transfer out to PCI bus 21 of the address, and the actual data (from memory 18) are clocked off bus 21 into buffer 62 instead of being latched on to bus 21. The data from buffer 62 are then sent through multiplexer 34 to the input port of video RISC processor 38. During data input, only one word of data is transferred per busmaster cycle.

Prior Art Overlay Techniques

Figure 4:
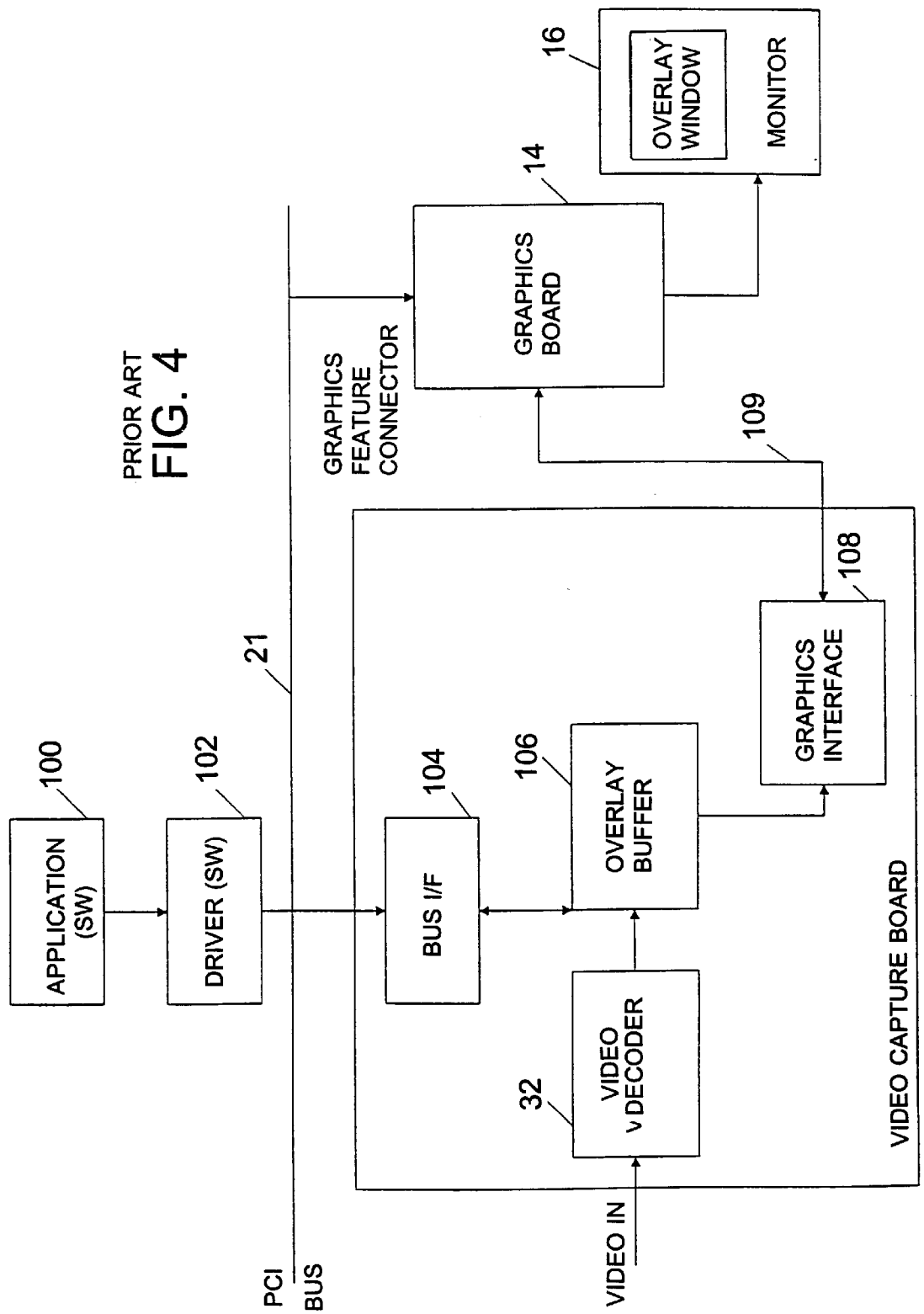
FIGS. 4 and 4A are block diagrams illustrating prior art techniques for achieving an overlay of video in a computer monitor.
Figure 4A:
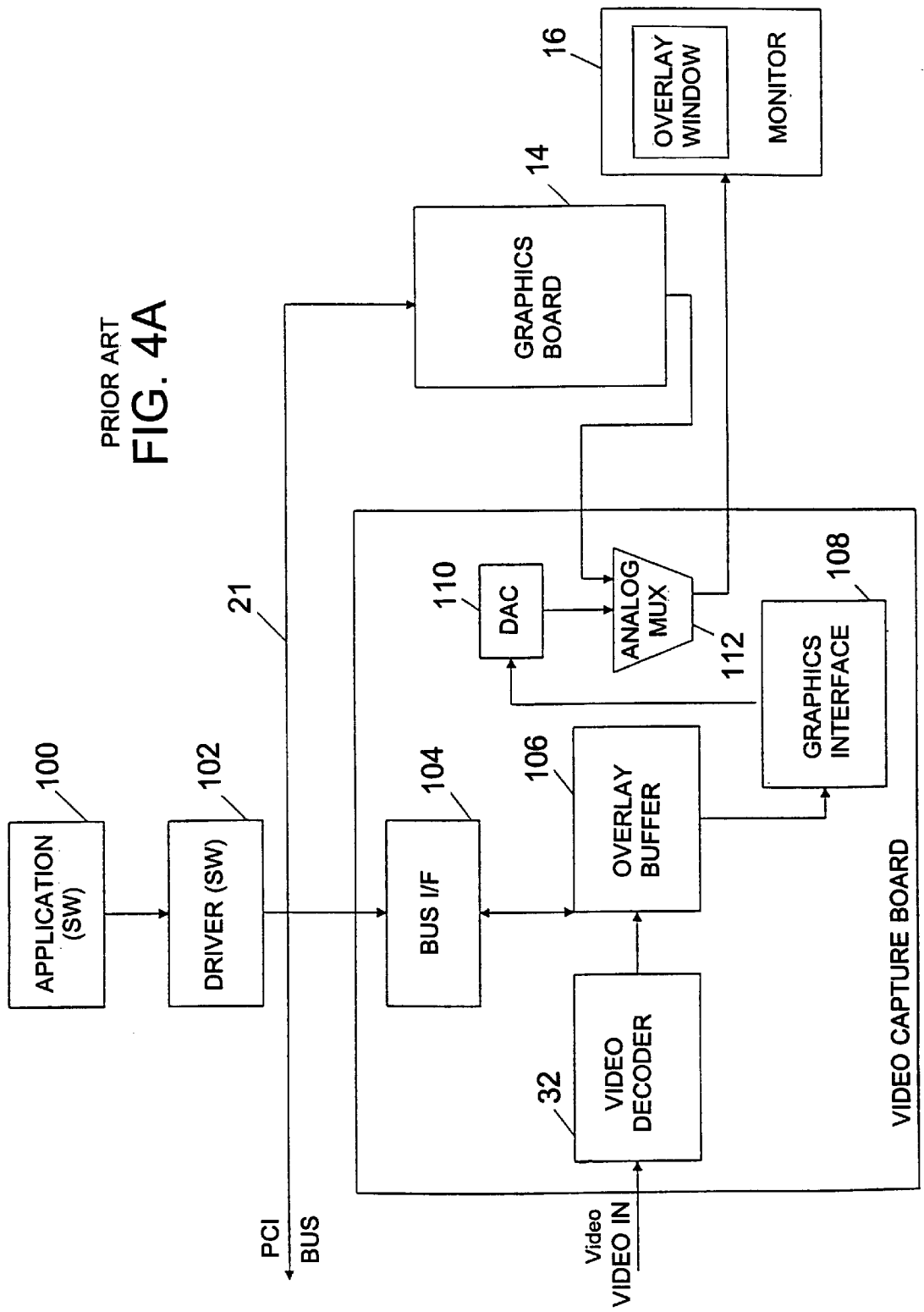

FIGS. 4 and 4A show two techniques used to create overlays in which video is displayed in a window of a monitor in prior art computer video systems. In both techniques overlay buffer 106 resides on capture board 114, and video is sent from overlay buffer 106 to monitor 16. In the FIG. 4 technique, video is sent from overlay buffer 106 through graphics interface 108 using a special, hardwired graphics feature connection 109 to graphics board 14. Video data are then sent to monitor 16. In the FIG. 4A technique, video is sent from the overlay buffer 106 to graphics interface 108, and from there to DAC 110, where it is converted to analog form. Analog multiplexer 112 switches between the analog signal from graphics board 14 and the analog output of DAC 110 to provide an overlay (based on the signal from DAC 110) in the display in monitor 106.

Virtual Overlay

Figure 5:
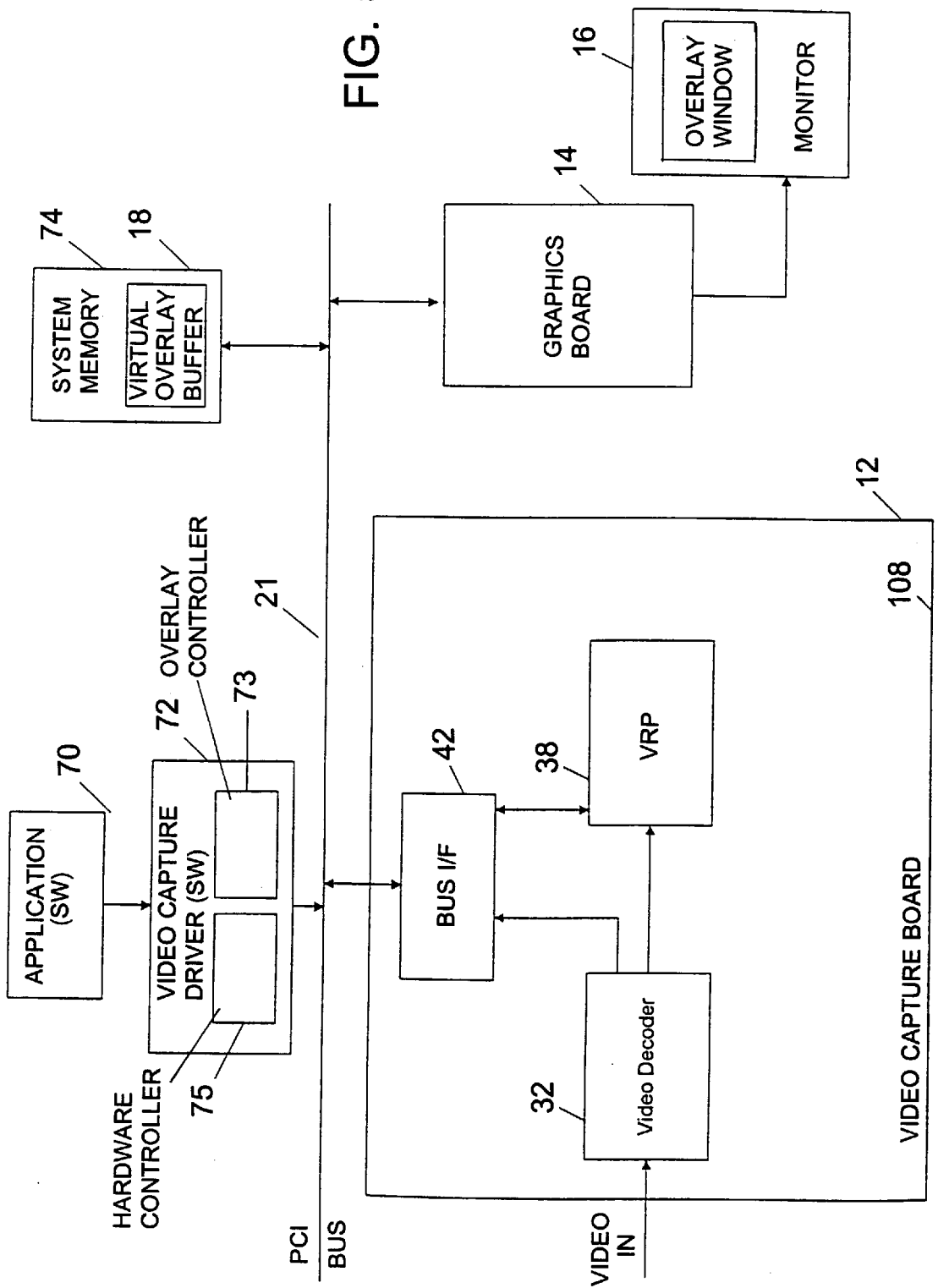
FIG. 5 is a block diagram illustrating a technique for achieving a virtual overlay of video in a computer monitor of the FIG. 1 system.

Referring to FIG. 5, there are shown the components of the computer based video system 10 that provide for a virtual overlay in monitor 16. The display of the overlay buffer on the monitor 16 is controlled from a software application 70. The software application 70 uses a standard interface to the video capture driver 72, and thus an application used with prior art techniques as shown in FIGS. 4 and 4A can be used to control the virtual overlay employed in system 10. An example of a commercially available software application 70 that can be used is one available from Adobe under the Premier trade designation. Video capture driver 72 implements the virtual overlay operation using a combination of hardware on digital video card 12, shown in FIG. 5 in a simplified form, a portion of system memory 18 designated virtual overlay buffer 74, and software labelled overlay controller 73 that controls the overlay process. Video capture driver 72 also includes software labelled hardware controller 75 that controls hardware. Video capture driver 72 sets card 12 to send YUV video data from decoder 32 through bus interface circuit 42 to virtual overlay buffer 74 of system memory 18. Video capture driver 72 then transfers the video from the virtual overlay buffer 74 in system memory 18 through graphics card 14 to be displayed as an overlay window on the monitor 16.

The specification of the size and position of the overlay window on monitor 16 is controlled from software application 70 using a standard driver interface. Video capture driver 72 then sets the hardware and software up to perform the operation as specified. The virtual overlay thus relies on system memory 18 to provide the overlay buffer, avoiding the need for a dedicated hardware buffer for overlay. In addition, the use of the system memory for the overlay buffer is transparent to software application 70.

Codec Operation

Figure 7:
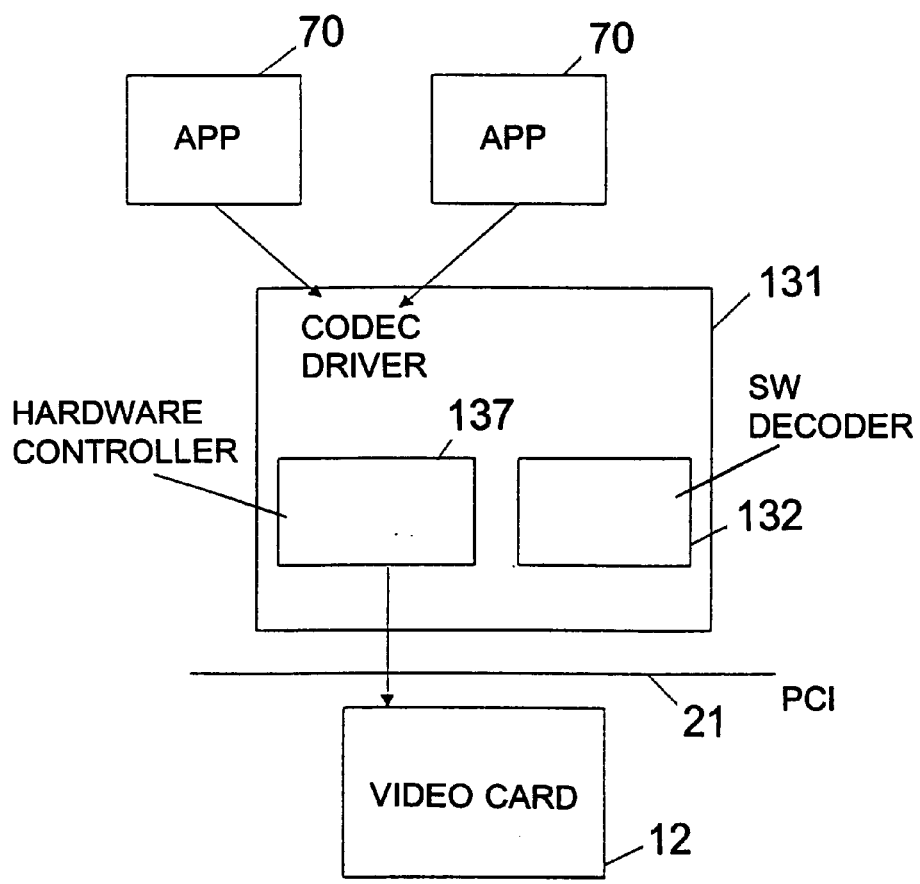
FIG. 7 is a diagram showing modules used in a playback mode of the FIG. 1 system.

Referring to FIG. 7, codec driver 131 is used by application programs 70 to either compress or decompress video. In general, video is compressed or decompressed on video card 12 under the control of hardware controller 137. Software decoder 132 is used when there is insufficient bandwidth to transfer the decompressed video across PCI bus 21 owing to limitations of the particular computer 15 or other bus operations. Software decoder 132 is also used if the hardware is busy performing another operation such as data capture.

Preview/Overlay Operation

Figure 6:
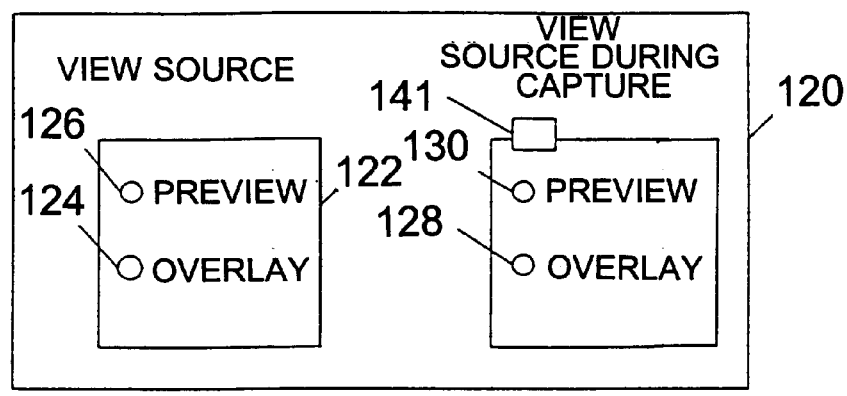
FIG. 6 is an illustration of display of a dialog box used to select various viewing and capturing options when using the FIG. 1 system.

Referring to FIG. 6, system 10 presents the user with various options for viewing source material with and without capture of the source material using dialog box 120 provided by software applications 70 on monitor 16. When viewing video without capture (e.g., to identify source material of interest without using up memory space with video data) the user can immediately activate a capture data button displayed on monitor 16 when he spots video of interest. As the user moves between the modes, the operation is automatically controlled by the settings set in dialog box 120. The user can enter a selection in view source box 122 to control the modes of operation when viewing the source material without capture. Within this box the user can select between the overlay operation with button 124 (as already described to provide a real time display based upon uncompressed YUV data) or a "preview" operation, with button 126, in which compressed video data transferred over PCI bus 21 to system memory 18 are accessed and decompressed in software to provide a display on monitor 16. With the latter operation the image might not be updated as quickly as with the virtual overlays and there is an inherent delay between the audio and the software-decompressed video; however, the latter operation permits use with computers 15 having insufficient bandwidth over bus 21 to transfer uncompressed video data at the rates required for overlay. The preview operation also allows the user to view the quality of the captured and decompressed video, to see, e.g., if the compression setting should be adjusted to improve quality. In dialog box 120, the user can also enables, with check box 141, the "view source during capture operation" in order to view the video during capture. The user can again select button 128 or 130 for the overlay or "preview" (ie., software decompression) mode of viewing the material being captured. In providing the preview/overlay options, software applications 70, video capture driver 72 and codec driver 131 act as a display controller that is programmed to permit the user to selectively display the video being compressed in either a preview mode or the overlay mode.

In the overlay mode, video capture driver 72 is used to provide an overlay based upon uncompressed video, as has already been described above with respect to FIG. 5. In the preview modes codec driver 131 is used to decode compressed video using software decoder 132, as described above in connection with FIG. 7. The actual mode employed is transparent to software applications 70.

Compression Rate Adjustment

Figure 7A:
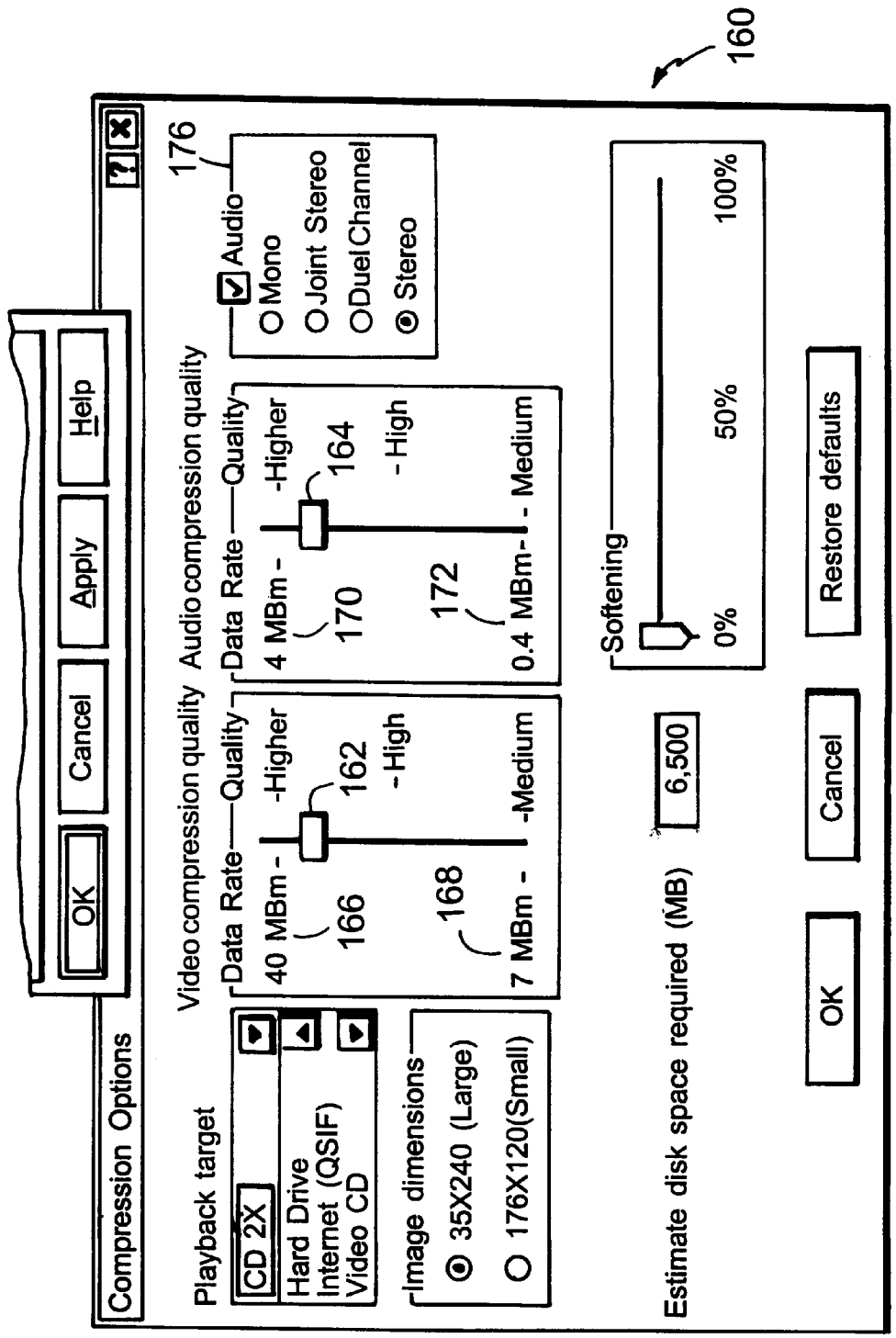
FIG. 7A shows a user interactive menu box used to select the video and audio compression rates.

FIG. 7A shows user interactive box 160 used to select the video and audio compression rates. Sliders 162, 164 are moved by the user to select the amount of compression desired between upper and lower video limits 166, 168 and upper and lower audio limits 170, 172. The video and audio playback targets are selected in boxes 174, 176, and lower limits 168, 172 are adjusted automatically in order to set a minimum compression rate needed to provide minimum quality levels depending upon the particular targets for the compressed files. This permits the user to use a minimum setting to save memory space if desired, but guarantees that a minimum quality level be achieved.

Video/Audio Compression

Figure 8:
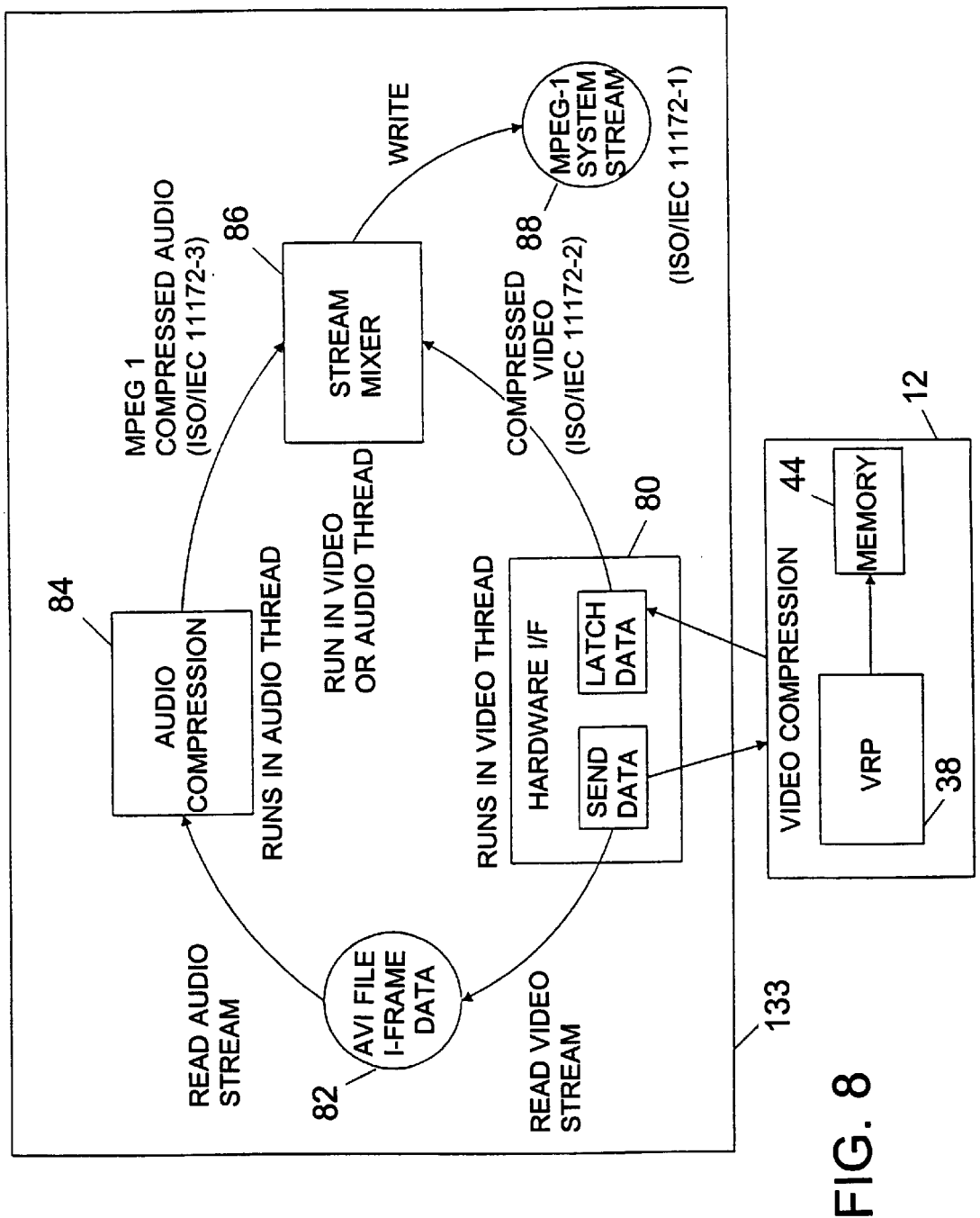
FIG. 8 is a diagram of components used in combining audio and video streams in the FIG. 1 computer based video system.

FIG. 8 shows how an I-frame compressed file is converted to a full MPEG IBP file using both the digital video board hardware and CPU 25 for the video and audio compression operations. The audio and video operations are run in parallel in audio and video threads. AVI file 82 includes I-frame compressed video and associated audio data stored in a Video for Windows standard AVI file format. Audio compression unit 84, which runs on CPU 25 of computer 15, reads the audio data out of AVI file 82 and performs compression of the audio data into an MPEG 1 compression audio format in the audio thread.

In parallel with this operation, hardware interface unit 80 takes the video portion of AVI file 82 and sends the I-frame compressed data to digital video card 12 in the video thread. Video RISC processor 38 of the digital video card 12 decompresses the I-frame video data and recompresses the video data into a fully compressed MPEG IBP stream. The MPEG IBP stream is fed back to hardware interface 80 and is sent from there to stream mixer 86, which operates in both the audio and the video threads. Stream mixer 86 also receives data from the audio compression unit 84. The stream mixer then combines the audio and video components to produce a MPEG 1 compliant system stream which is written back to hard disk 26 in the form of MPEG 1 file 88. The relevant ISO/IEC standards defining the data streams are shown on FIG. 8.

Video/Audio Synchronization

Figure 9:
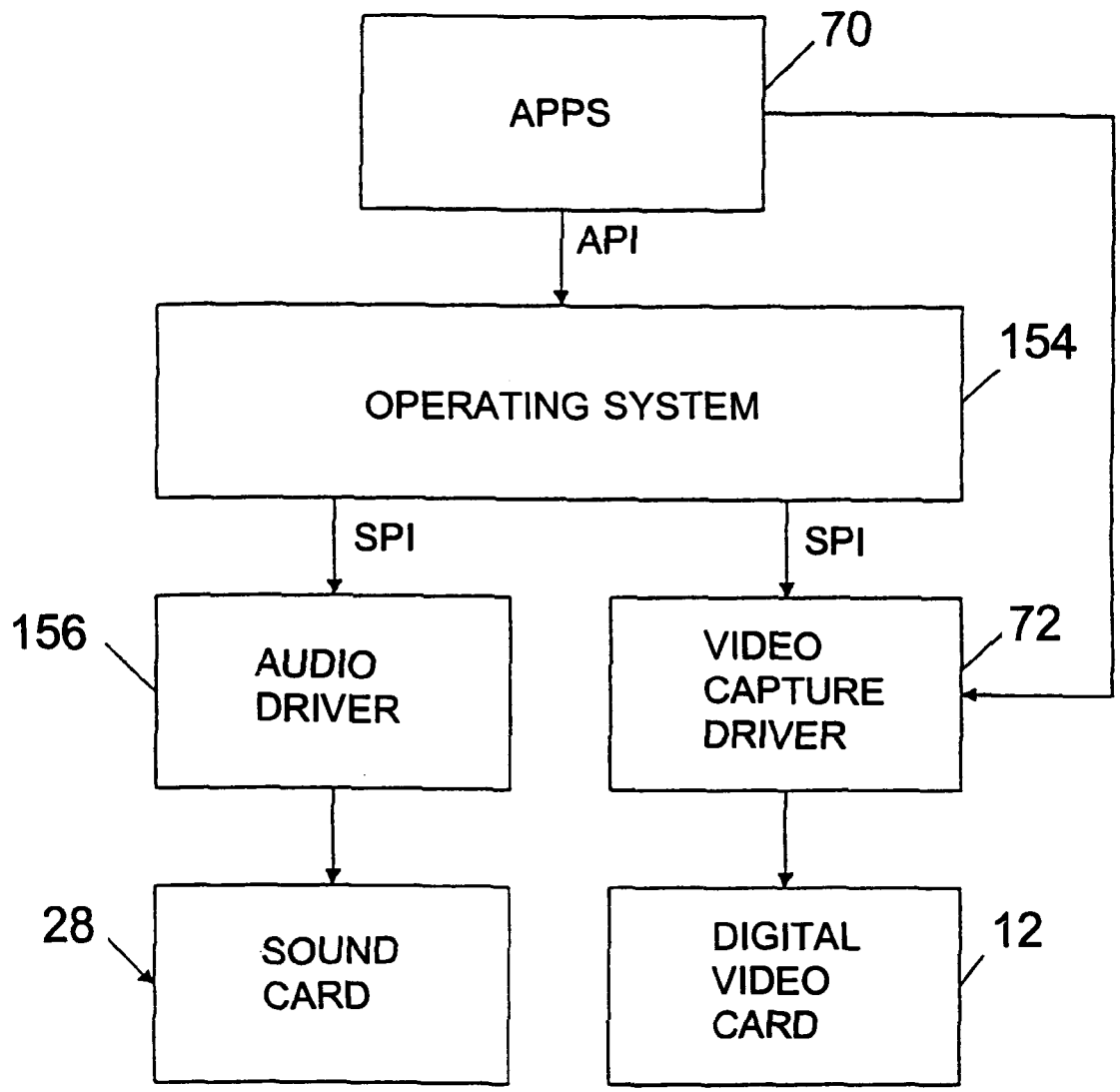
FIG. 9 is a diagram of modules used in synchronizing audio and video streams in the FIG. 1 computer based video system.

FIG. 9 shows how sound card 28 and digital video card 12 are each controlled by respective drivers 156, 72, which in turn are controlled by applications 70 operating through operating system 154 (Video for Windows). In order to permit digital video card 12 and associated software 19 (FIG. 1) to be used on computers 15 employing a variety of different sound cards 28 having a variety of different start-up delay times, the sound cards are calibrated each time that the video driver is opened or the audio capture settings have been changed. This is done by instructing audio driver 156 to begin digitizing audio data at sound card 28 and monitoring the time it takes to receive a return of call indicating that a buffer in audio driver 156 has been filled. The known time it takes for the buffer to fill is then subtracted to determine the time that digitized data were first presented to the buffer, and this time is compared with the time at which the original instruction to digitize went out to determine the delay time, which is then used as a start up delay time to synchronize the video and audio digitized streams. Appendix A is a pseudo code listing of the calibration process.

The MPEG-1 files that are created can be used in business presentations or sent over a network for playback on any personal computer having MPEG 1 playback. Many personal computers with multimedia capabilities include software decompressors capable of decoding MPEG compressed video files.

Other Embodiments

Other embodiments of the invention are within the scope of the appended claims. E.g., while the embodiment described above is designed to provide short video programs, e.g., a minute or less, many of the inventions described herein have application in systems dealing with larger programs.

Digitized data can be transferred without CPU interrupts to or from picture buffers implemented in other locations besides system memory 18; e.g., they could be located on a video card, and the no-interrupt process could be used to transfer data out of the card.

The overlay buffer could be provided on the graphics subsystem. The sound card, graphics card, and disk could be connected to the bus in an expansion slot or provided on the motherboard of the computer. The circuitry on video capture card 12 could also be provided on the motherboard of computer 15.

APPENDIX A

```
Pseudocode for audio startup synchronization
intGetAudioDelay ()
{
    //Allocate, prepare, and add a half second audio buffer
    HeapAllocateAudioBuffer(BytesPerSecond/2);
    AudioOpen();
    AudioPrepareBuffer():
    AudioAddBuffer();
    //start audio capture
    AudioStart();
    //If we've got audio samples already, stop here. We end
    //up with a negative delay (by the time AudioStart()
    //completes audio samples have already been captured).
    //If no audio samples are seen yet, the delay is usually
    //positive (audio samples are not captured until some
    //time after the completion of the audio start routine).
    if (Position = AudioGetPositionInMilliseconds() !=0){
        Delay = (Position "-1);
    } else{
    //get the time AudioStart)exited.
    Start = timeGetTime();
    //wait until we get some audio samples
    while ((Position = AudioGetPositionInMilliseconds())}=0;
    //get the time it took to start to see audio samples
    Total = timeGetTime();
    //the delay to the start of audio is the time it took
    //see audio samples minus the milliseconds of audio
    //captured; this number may still be negative, as some
    //audio drivers may not report an audio position until
    //the audio buffer is filled, but may have started
    //capturing audio before returning from AudioStart().
    Delay = (Total − Position);
    }
    //clean up capture...
    AudioReset();
    AudioUnprepareBuffer();
    AudioClose();
    //free buffer
    FreeAudioBuffer(BytesPerSecond/2);
    //return delay
    return(Delay);
}
```

What is claimed is:

1. A computer system for compressing and storing video and audio on a computer comprising an audio input subsystem that receives and digitizes said audio, said audio input subsystem having a startup delay that comprises a delay from the time said audio input subsystem receives an instruction to digitize said audio to the time it outputs results of digitizing said audio, a video input port that receives uncompressed video in real time, a compressor circuit that receives said uncompressed video from said input port and outputs compressed video, and a controller that is implemented in software and calibrates said startup delay of said audio input subsystem and uses the result of calibrating said startup delay to synchronize said audio and said video.

2. The system of claim 1 wherein said controller calibrates startup delay of said audio input subsystem by sending an instruction to start digitizing audio and monitoring how long it takes the audio input subsystem to start digitizing after the instruction has been sent.

3. The system of claim 1 wherein said audio input subsystem includes an audio driver that controls said audio input subsystem and wherein said monitoring includes monitoring of a buffer in said audio driver.

4. The system of claim 3 wherein said audio input subsystem includes a sound card that plugs into an expansion slot of said computer system.

5. The system of claim 3 wherein said audio input subsystem includes circuitry that resides on a motherboard of said computer system.

6. The system of claim 1, wherein said video input part and said compressor circuit reside on a peripheral board that plugs into an expansion slot of said computer system.

7. The system of claim 4 wherein said video input port and said compressor circuit reside on a peripheral board that plugs into an expansion slot of said computer system.

8. A method of compressing and storing video and audio on a computer system comprising receiving and digitizing, at an audio input subsystem, said audio input subsystem having a startup delay that comprises a delay from the time said audio input subsystem receives an instruction to digitize said audio to the time it outputs results of digitizing said audio, receiving uncompressed video in real time at a video input port of said audio input subsystem, receiving, at a compressor circuit, said uncompressed video from said input port and said compressor circuit outputting compressed video, calibrating, at a controller that is implemented in software, said startup delay of said audio input subsystem, and using, at said controller, the result of calibrating said startup delay to synchronize said audio and said video.

* * * * *